Patented Oct. 4, 1927.

1,644,524

UNITED STATES PATENT OFFICE.

WINFRID HENTRICH AND MAX HARDTMANN, OF WIESDORF, NEAR COLOGNE-ON-THE-RHINE, GERMANY, ASSIGNORS TO GRASSELLI DYESTUFF CORPORATION, OF NEW YORK, N. Y., A CORPORATION OF DELAWARE.

ACID SULPHURIC ACID ESTER COMPOUND OF AROMATIC HYDROXYALKYLETHERS.

No Drawing. Application filed June 21, 1926, Serial No. 117,595, and in Germany June 25, 1923.

Our invention resides in novel acid sulphuric acid ester compounds of aromatic hydroxyalkylethers and in processes of making the same.

The compounds may be generally designated by the formula:

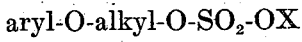

in which X stands for hydrogen or a salt forming basic residue.

We have found that by sulphating aromatic hydroxyalkylethers of the general formula

at temperatures below 100° C. the free hydroxylgroup attached to the alkylgroup is esterified and acid sulphuric acid esters are formed to which the general formula

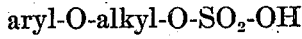

can be assigned.

The sulphation can be effected by means of chlor-sulphonic acid but even concentrated sulphuric acid under moderate conditions will readily sulphate, or esterify the hydroxylgroup. The acid sulphuric acid esters are obtained from the sulphation mass in form of their salts by salting out with alkali metal salts or by neutralization with calcium salts, separation from the precipitated calcium sulphate and transposition with alkali metal salts.

The alkali metal salts of the acid esters are easily water soluble, usually crystalline substances, and differ only slightly in their properties from the free acid esters.

The alkali metal salts of the acid esters may be generally designated by the formula:

These novel sulphuric acid ester compounds are mainly intended to be used as dyestuff intermediates; the dyestuffs obtained from them are usually distinguished by improved solubility and increased affinity for artificial silk and kindred products.

Many of the hydroxyalkylethers from which our novel sulphuric acid esters are derived have not been prepared heretofore. They are easily obtained by reacting with halohydrines upon alkali metal phenolates, naphtholates or hydroxyanthracene alkali metal salts.

The following examples will further illustrate our invention, it being understood that our invention is not limited to the particular substances mentioned, nor to the specific conditions used therein. The parts are by weight.

*Example 1.*—15 parts 3-nitro-4-hydroxy-1-methylbenzene are dissolved in 50 parts water containing 4 parts caustic soda. To this 8 parts glycol chlorhydrin are added and the reaction mass boiled at reflux for several hours. An oil separates which is stirred up with sodium carbonate solution, allowed to settle and dried; it solidifies to yellowish-white crystals, melting at 40° C. and is the ether of the formula

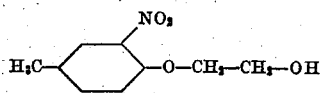

10 parts of this novel 3-nitro-1-methylbenzene-4-ethylene-glycol-ether are introduced into 30 parts sulphuric acid 66° Bé. The temperature rises to about 50° C. and the sulphation sets in and is finished in a short time. The reaction mass is then poured into ice water and the clear solution salted out with potassium chloride. The potassium salt of the acid sulphuric acid ester of 3-nitromethylbenzene-4-ethylene-glycol ether separates as yellowish-white crystals. It is exceedingly soluble in water and has most probably the formula

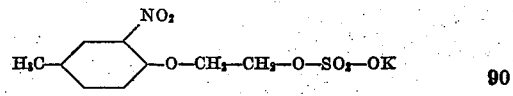

The alkali metal salts generally may be designated by the formula:

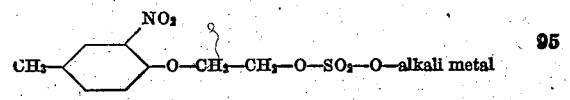

The nitro group of this ester can be reduced to the amino group and the so obtained amine diazotized. By coupling this diazo compound with beta naphthol a soluble bluish-red dyestuff and with p-nitroaniline a red dyestuff is obtained which is particularly suited for dyeing cellulose acetate silk.

*Example 2.*—5 parts beta-naphthyl-ethyleneglycol described in the Chemisches Zentral-Blatt, 1914, II, pages 1307 and 1308 and which has the formula

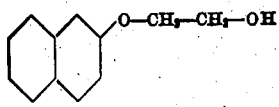

is dissolved in 15 parts 66° Bé. sulphuric acid. The temperature rises to 70° C. and the sulphation is completed in a few minutes. The reaction mass is poured into ice water and the solution saturated under stirring with sodium chloride. The sodium salt of the acid sulphuric acid ester of beta-naphthyl-ethylene-glycol ether separates as brilliant white leaflets. It has most probably the formula

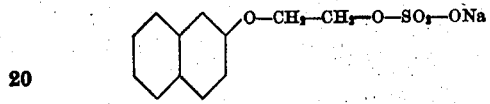

*Example 3.*—Alpha-anthranyl-ethyleneglycol ether of the formula

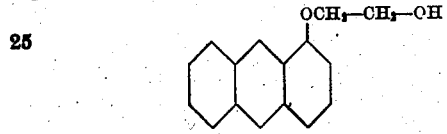

which can be obtained from alpha-hydroxyanthracene and glycol-chlorhydrin is, when recrystallized from alcohol, grayish-brown crystals of a melting point of 117–118° C. 10 parts of this ether are introduced into 30 parts 66° Bé. sulphuric acid, keeping the temperature below 15° C. After complete solution is obtained the mass is poured into 200 parts ice water and 30 parts common salt added. The sodium salt of the acid sulphuric acid ester of alpha-anthranyl-ethyleneglycol ether separates. It is, after drying, a grayish-black powder, easily soluble in water with a brown color and has most probably the formula

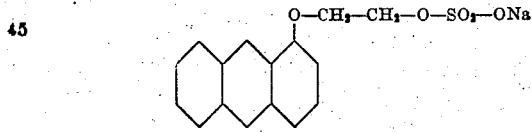

*Example 4.*—10 parts of alpha-naphthyl-alpha-beta-gamma-trihydroxypropane described in Chemisches Zentralblatt, 1908, II, page 2011 and having the formula

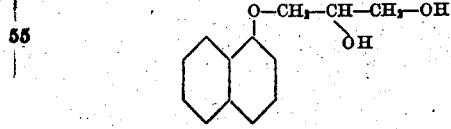

are introduced with cooling into 25 parts 66° Bé. sulphuric acid, keeping the temperature below 25° C. After the solution is complete it is poured into 200 parts water and a clear solution is obtained. This is neutralized with calcium carbonate and filtered from the precipitated calcium sulphate. The filtrate contains the calcium salt of the acid sulphuric acid ester of alpha-naphthyl trihydroxypropane. The requisite amount of soda ash is now added, filtered from calcium carbonate and the filtrate evaporated to dryness. A viscous, easily water soluble mass is obtained which is the sodium salt of the acid ester of the formula

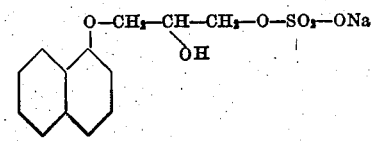

We claim:—

1. In processes of making acid sulphuric acid ester compounds of aromatic hydroxy-alkyl ethers the step comprising treating aromatic hydroxy-alkyl ethers with sulphating agents at room temperatures.

2. In processes of making acid sulphuric acid ester compounds of aromatic hydroxy-alkyl ethers the step comprising treating aromatic hydroxy-alkyl ethers with concentrated sulphuric acid at room temperatures.

3. In processes of making acid sulphuric acid ester compounds of aromatic hydroxy-alkyl ethers the step comprising treating aromatic hydroxy-alkyl ethers with concentrated sulphuric acid at temperatures below 100° C.

4. As new products acid sulphuric acid ester compounds of aromatic hydroxy-alkyl ethers of the probable general formula

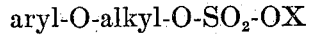

in which X stands for hydrogen or a salt forming basic residue, which are water soluble substances.

5. As new products alkali metal salts of acid sulphuric acid esters of aromatic hydroxy-alkyl ethers of the probable general formula

which are water soluble substances.

6. As a new product the alkali metal salts of the acid sulphuric acid ester of 3-nitromethylbenzene-4-ethyleneglycol ether having most probably the formula

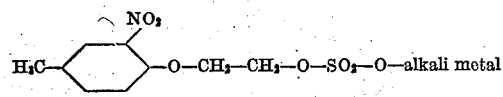

In testimony whereof, we affix our signatures.

WINFRID HENTRICH.
MAX HARDTMANN.